US011618416B2

(12) United States Patent  (10) Patent No.: US 11,618,416 B2
Giraud et al.  (45) Date of Patent: Apr. 4, 2023

(54) VEHICLE OPTICAL DETECTION SYSTEM

(71) Applicant: Valeo Systèmes d'Essuyage, Le Mesnil Saint Denis (FR)

(72) Inventors: Frédéric Giraud, Le Mesnil Saint Denis (FR); Christophe Le-Ligne, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 236 days.

(21) Appl. No.: 16/633,373

(22) PCT Filed: Jul. 4, 2018

(86) PCT No.: PCT/EP2018/068068
§ 371 (c)(1),
(2) Date: Jan. 23, 2020

(87) PCT Pub. No.: WO2019/029915
PCT Pub. Date: Feb. 14, 2019

(65) Prior Publication Data
US 2020/0231126 A1  Jul. 23, 2020

(30) Foreign Application Priority Data

Aug. 9, 2017  (FR) ...................................... 1757613

(51) Int. Cl.
*B60S 1/48* (2006.01)
*B60S 1/08* (2006.01)
(Continued)

(52) U.S. Cl.
CPC ............ *B60S 1/481* (2013.01); *B60S 1/0848* (2013.01); *B60S 1/52* (2013.01); *B60S 1/56* (2013.01); *B60R 2300/806* (2013.01)

(58) Field of Classification Search
CPC .......... B60S 1/481; B60S 1/0848; B60S 1/52; B60S 1/56; B60S 1/566; B60S 1/0411;
(Continued)

(56) References Cited

U.S. PATENT DOCUMENTS

2011/0266375 A1  11/2011  Ono et al.
2015/0298657 A1  10/2015  Kanter et al.
2016/0021434 A1*  1/2016  Arakawa .................. H04Q 9/00
340/870.01

FOREIGN PATENT DOCUMENTS

DE  10115975 A1 * 10/2002 ............. B60S 1/481
DE  10115975 A1  10/2002
(Continued)

OTHER PUBLICATIONS

International Search Report and Written Opinion in corresponding International Application No. PCT/EP2018/068068, dated Aug. 12, 2018 (10 pages).
(Continued)

*Primary Examiner* — Katina N. Henson
(74) *Attorney, Agent, or Firm* — Osha Bergman Watanabe & Burton LLP

(57) ABSTRACT

An optical detection system (100) for a vehicle (1) comprises at least one sensor (4) and a spraying device (5) for spraying a cleaning product onto the glazed surface (21) of this sensor. The sensor (4) is electrically connected to a power-supply and control network (11). According to the invention, the sensor (4) and the spraying device (5) are electrically connected to each other in the aim of controlling the spraying device (5).

16 Claims, 3 Drawing Sheets

Figure 1:
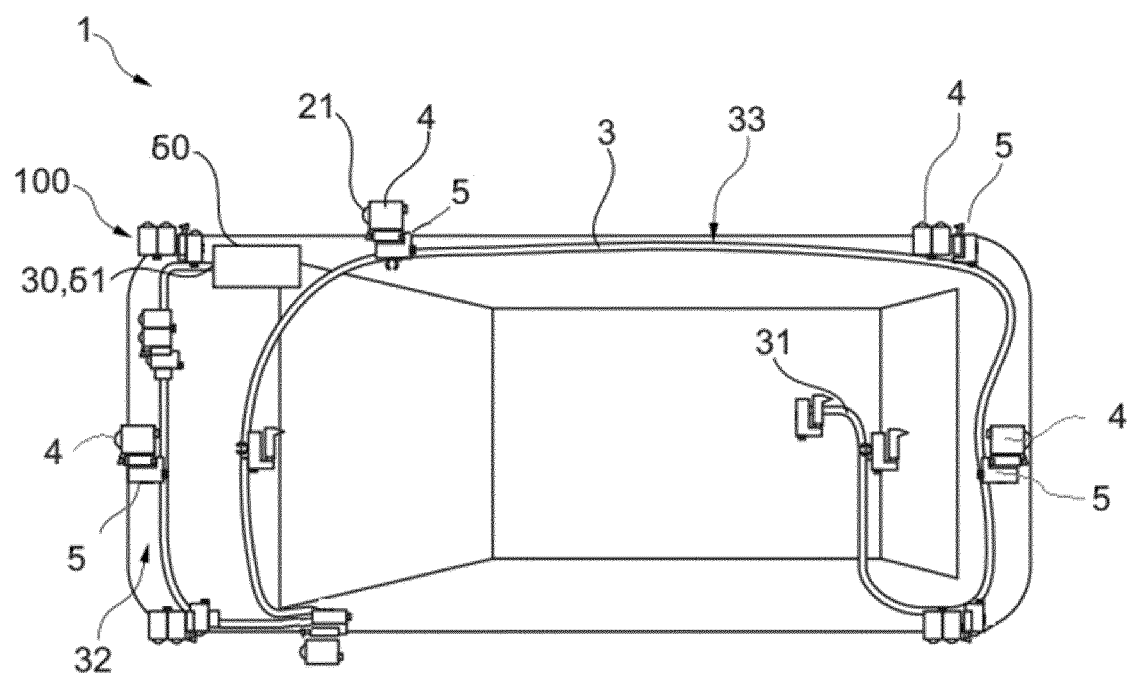

(51) Int. Cl.
*B60S 1/52* (2006.01)
*B60S 1/56* (2006.01)

(58) Field of Classification Search
CPC ...... G01S 17/931; G01S 7/4813; G01S 7/521; G01S 13/931; G01S 2007/4977; G01S 2007/52011; G01S 2007/4043; G01S 2013/93273
USPC .......................................... 15/313; 134/58 R
See application file for complete search history.

(56) References Cited

FOREIGN PATENT DOCUMENTS

| DE | 10 2016 006039 | A1 | | 11/2016 | | |
|----|----|----|----|----|----|----|
| DE | 102016006039 | A1 | * | 11/2016 | ............. | G01S 7/521 |
| EP | 2949520 | A1 | | 12/2015 | | |
| EP | 3168094 | A1 | | 5/2017 | | |
| JP | 2011230672 | A | | 11/2011 | | |
| JP | 2014201150 | A | | 10/2014 | | |
| JP | 2015214269 | A | | 12/2015 | | |
| JP | 2015224032 | A | | 12/2015 | | |
| JP | 2017193323 | A | | 10/2017 | | |

OTHER PUBLICATIONS

Notice of Reasons for Refusal in corresponding Japanese Application No. 2020-507068, dated Mar. 11, 2022 (5 pages).
Search Report in corresponding Japanese Application No. 2020-507068, dated Mar. 9, 2022 (23 pages).
First Office Action in corresponding Chinese Application No. 201880051321.0, dated Sep. 5, 2022 (7 pages).

* cited by examiner

VEHICLE OPTICAL DETECTION SYSTEM

The invention relates to the field of optical detection systems equipping motor vehicles. It more particularly relates to the field of optical detection systems equipped with a system for cleaning a glazed surface of such vehicles.

Optical detection systems are known that include one or more sensors respectively associated with a spraying device for spraying a cleaning product for cleaning a glazed surface, these sensors being able to be disposed at the front end and/or at the rear end and/or on a rearview mirror of the vehicle.

These optical detection systems can be actuated by an automatic control triggered by a drive and/or maneuver aid device of this vehicle. A glazed surface associated with such an optical detection system corresponds, for example, to a glass for protecting its sensor.

In these optical detection system architectures, each sensor is electrically connected to an electronic databus for exchanging data with a main electronic unit. When the sensor is a video camera, such a data exchange can be a video signal. The detection system spraying device is connected in turn to a second electronic databus so as to allow it to be controlled from this main electronic unit or another electronic unit. Such an architecture imposes several electronic buses to electrically connect the different components of an optical detection system.

Furthermore, it will be understood that in order to allow a large number of sensors to be electrically connected to the main electronic unit, it is then necessary to provide an optical detection system including a large number of electronic buses. Each of these electronic buses represents a cost significantly weighting the overall cost of the optical detection system.

Moreover, in order to supply the spraying devices of these optical detection systems with cleaning product, such an architecture can include a pump connected to each of these spraying devices, via a main solenoid valve for diverting the cleaning product supplied by the pump to each of the optical detection systems of the vehicle. Thus, in this architecture, the spraying devices of the optical detection systems are supplied by the pump separately from each other.

When an optical detection system of the vehicle includes a large number of spraying devices supplied by the same pump, it is necessary to provide a pipe for hydraulically connecting the corresponding spraying device directly to the pump or via the main solenoid valve. The optical detection system then comprises a plurality of spraying devices directly connected to the pump or via the main solenoid valve through a plurality of pipes. Each of these pipes represents a cost also significantly determining the overall cost of the optical detection device.

Furthermore, these architectures of optical detection systems for vehicles impose the provision of complex hydraulic and electrical circuits in the vehicle allowing the associated pipe to be guided from the pump to the corresponding spraying device and to guide the associated electronic controls from the main electronic unit to the sensor and/or the spraying device.

The aim of the present invention is to remedy at least one of the abovementioned disadvantages and to propose an optical detection system for equipping a vehicle and allowing its overall cost to be reduced while simplifying its installation in the vehicle.

To that effect, the object of the invention is an optical detection system for a vehicle comprising at least one sensor and a spraying device for spraying a cleaning product onto the glazed surface of this sensor, the sensor being electrically connected to a power-supply and control network. According to the invention, the sensor and the spraying device are electrically connected to each other with a view to controlling the spraying device.

The following mean:
"cleaning product", a liquid or gaseous product able to be sprayed onto a glazed surface with a view to cleaning same, such a product equally able in the present invention to be water, windshield washer or air, "glazed surface", a transparent surface that can be an optical surface of an optical detection system equipping the vehicle; in particular, it is possible to envisage that the glazed surface is made of glass or a plexiglass type of transparent plastic, "sensor", an acquisition device that can be a video camera or a laser scanner required to allow a drive and/or maneuver aid device of the vehicle to operate, the glazed surface associated with this sensor having to be dirt-free so as to obtain the best possible image, "power-supply and control network", an electrical network configured to transport one or more control instructions that can be processed by the sensor and/or the spraying device, and an electrical power supply required for the sensor and the spraying device to operate; this power-supply and control network can be made in one piece, with cables susceptible of transporting the current on one hand and the control instruction on the other, or can be made as two separate electrical channels, namely a power-supply network and a separate control network, without departing from the context of the invention.

Thanks to the optical detection system according to the invention, it is possible substantially to reduce the overall cost of installing such an optical detection system in the vehicle. In effect, contrary to the architecture of known optical detection systems, the sensor and the associated device for spraying cleaning product are not connected independently of each other to a power-supply and control network, but a part of the network is made common to these two elements. In other words, the network is directed to the sensor and the information or power supply recovered by the sensor are transmitted to the spraying device by a cable reduced to only the distance between the device for spraying cleaning product and the sensor. It is understood that the optical detection system according to the invention is all the more attractive since the spraying device is disposed as near as possible to the sensor.

This way, it is significant according to the invention that the arrangement of the electrical circuits of an optical detection system equipping a vehicle and the assembly operations are largely simplified. The operator will only have to connect the sensor to the power-supply and control network on site, the spraying device being connected to the sensor beforehand, being understood that according to the invention, the spraying device does not have to be connected to the power-supply and control network.

Furthermore, the electrical cables are regularly fastened to structural elements of the vehicle by clips, either along or through walls delimiting the passenger compartment for example, and it is understood that the direct connection of the spraying device to the sensor, in particular when these two elements are arranged close to each other, allows the number of these clips to be reduced, and therefore the cost of the parts to be provided for the installation of the optical detection system in the vehicle and the time needed for installing the system.

According to a characteristic of the invention, the spraying device comprises an atomizer and an actuation device for actuating this atomizer. In particular, the actuation device can be a solenoid valve. It is understood that other types of actuation device could be implemented, as long as they are susceptible of influencing the operation of the atomizer by receiving an appropriate electronic control instruction.

When an automatic control order for cleaning is received by a control electronic module via the power-supply and control network, the control electronic module transmits and/or generates the instruction for controlling the actuation device so as to authorize the passage of the cleaning product from a hydraulic distribution network to the atomizer, and if need be, so as to authorize the movement of the atomizer, in order to spray the cleaning product onto the glazed surface associated with same.

The atomizer can be of the fixed or telescopic type. In other words, the spraying device is configured so that the nozzle or nozzles for spraying the cleaning product maintain a fixed position during and between cleaning operations, or so that these spraying nozzles are assembled on a telescopic body susceptible of adopting a cleaning position facing the glazed surface and a retracted position.

According to different characteristics of the invention, taken alone or in combination, it can be envisaged that:
- the actuation device and the sensor include electrical connection elements that cooperate to transmit a power supply and/or a control instruction from the power-supply and control network to the actuation device, by means of the sensor;
- the actuation device includes a control electronic module for ensuring control of same;
- the sensor comprises an electrical connection terminal and the actuation device comprises an electrical connection plug, the electrical connection plug of the actuation device being electrically connected to the power-supply and control network via the electrical connection terminal of the sensor;
- the electrical connection terminal of the sensor comprises two pins electrically connected to each other, a first pin being intended to be electrically connected to the power-supply and control network and the second pin being intended to be connected to the electrical connection plug of the actuation device, by means of a connection cable; it is understood that the connection cable is already connected between the sensor and the associated spraying device at the moment of assembly on the vehicle, which simplifies the assembly of the elements on the vehicle; the connection cable is configured to transmit control and power supply according to what has already been received by the sensor directly from the power-supply and control network;
- the sensor includes a control electronic module configured to generate the operation of the actuation device;
- the sensor comprises a first electrical connection terminal and a second electrical connection terminal separate from each other, and in that the actuation device comprises an electrical connection plug, the first electrical connection terminal of the sensor being connected to the power-supply and control network and the second electrical connection terminal of the sensor being connected to the electrical connection plug of the actuation device;
- only a first electrical connection terminal includes a pin dedicated to the transmission of data, this pin being connected on one hand to the control electronic module of the sensor and on the other to the power-supply and control network; and each electrical connection terminal includes two pins dedicated to supplying power, of which one pin dedicated to a positive power supply terminal and one pin dedicated to earth, these pins being electrically connected two by two, the two pins of the first electrical connection terminal being intended to be electrically connected to the power-supply and control network and the two pins of the second electrical connection being intended to be electrically connected to second and third pins of the electrical connection plug of the actuation device. It is thus understood that the control electronic module associated with the sensor is configured to retrieve the control information on the power-supply and control network, then to process this information and deduce therefrom an operating mode of the cleaning device, and in particular to determine the suitable moment for powering the spraying device. And that at the same time, the connection terminals and plugs are configured to transmit power directly from the power-supply and control network to the spraying device.

According to a characteristic of the invention, the control electronic module, whether fitted on the actuation device of the spraying device or arranged on the sensor, is configured to analyze the set of control instructions passing through the power-supply and control network and to retrieve in this set the control instruction or instructions corresponding to the spraying device.

According to a characteristic of the invention, a casing accommodates the sensor and the spraying device.

According to a characteristic of the invention, the optical detection system comprises a plurality of sensors and associated devices for spraying a cleaning product, the sensors being electrically connected to a databus, forming the power-supply and control network, independently of each other.

According to a characteristic of the invention, the optical detection system comprises a hydraulic distribution bus able to allow the cleaning product to circulate, the spraying devices being connected to the hydraulic distribution bus independently of each other. "Hydraulic distribution bus" means a pipe allowing the transit of the cleaning product.

It is now possible even more to reduce the overall cost of the installation in the vehicle of such an optical detection system. In effect, contrary to the architecture of known cleaning systems, only one hydraulic distribution bus is used to supply hydraulically a plurality of spraying devices equipping the vehicle. These spraying devices are each hydraulically connected to this same hydraulic distribution bus along same such that each of the spraying devices can be served with cleaning product by the hydraulic distribution bus independently of each other.

According to an embodiment of the invention, the hydraulic distribution bus forms an open hydraulic circuit. In other words, the cleaning product circulating in the hydraulic distribution bus is at a substantially different pressure between a first end of the hydraulic distribution bus connected to an outlet of the pump and a second end of the hydraulic distribution bus, closed and opposite the first end, when all of the spraying devices connected to this hydraulic distribution bus are actuated.

It can be envisaged that the hydraulic distribution bus forms a closed hydraulic circuit. In other words, the cleaning product circulates in a closed loop and as such has a virtually constant pressure at the inlet and at the outlet of the hydraulic distribution bus, when all of the spraying devices connected to this hydraulic distribution bus are actuated.

According to a characteristic of the invention, the optical detection system comprises a pump able to supply the hydraulic distribution bus with cleaning product. In particular, the pump can supply the hydraulic distribution bus by drawing cleaning product from a tank for storing this product. When the hydraulic distribution bus forms a closed hydraulic circuit, a first end of the hydraulic distribution bus is connected to an outlet of the pump and a second end of the hydraulic distribution bus opposite the first end is connected to an inlet of the pump.

According to a characteristic of the invention, the hydraulic distribution bus comprises at least two portions arranged either side of a wall and connected to each other by a hydraulic connector. This embodiment makes it possible hydraulically to connect two portions of the hydraulic distribution bus extending along the vehicle and forming according to the invention the main distribution pipe, these two portions being separated by a wall of the vehicle. The hydraulic connector can be installed in an opening formed in this wall. Such a wall can be metal or plastic and corresponds to a wall on the distribution path of the hydraulic distribution bus passing through the vehicle in order to serve the spraying devices.

One end of each hydraulic distribution bus portion intended to be connected to each other can support a hydraulic connection port for connecting it to the hydraulic connector.

In this hydraulic distribution bus context, the at least two spraying devices can in particular be connected to the same portion of the hydraulic distribution bus, or can be respectively connected to different portions of the hydraulic distribution bus. In particular, it can be envisaged that the distribution devices are arranged such that each portion of the hydraulic distribution bus serves at least two spraying devices.

According to characteristics of the invention, at least one of the spraying devices comprises hydraulic components for connection to the hydraulic distribution bus. In other words, each of the spraying devices is connected to the hydraulic distribution bus by a hydraulic connection component. And, in a complementary way, at least one of the spraying devices comprises components for mechanical holding on the hydraulic distribution bus.

These hydraulic connection components can be formed by syringes provided to pierce the hydraulic distribution bus.

According to a characteristic of the invention, the hydraulic connection component and the mechanical holding component of each of the spraying devices can be supported by the actuation device, which can advantageously be hydraulically and mechanically connected to the hydraulic distribution bus in a single assembly operation.

In a particular way, the hydraulic connection component and the mechanical holding component of each of the spraying devices can be supported by the casing. The casing, equipped beforehand with the spraying device and the sensor can then be hydraulically and mechanically connected to the hydraulic distribution bus. The casing then forms a hydraulic and mechanical connection interface between the hydraulic distribution bus and the corresponding spraying device.

According to a characteristic of the invention, the power-supply and control network and the hydraulic distribution bus form a single electrical and hydraulic bus for distributing the spraying devices. The optical detection systems are connected separately from each other on this electrical and hydraulic distribution bus. In other words, the power-supply and control network is formed jointly with the hydraulic distribution bus.

Thanks to this particular embodiment, it is possible to simplify the assembly of the optical detection system in the vehicle. The optical detection systems can thus be hydraulically and electrically connected from a common part of the distribution bus.

The electrical and hydraulic distribution bus can in particular be flexible. In other words, the electrical and hydraulic distribution bus can be made in an elastic material.

According to a characteristic of the invention, the electrical and hydraulic distribution bus includes an extruded tube having in the center of the tube a central channel inside which the cleaning product is susceptible of circulating and having on the periphery of the tube pipes inside which each of the power-supply and control strands are susceptible of circulating.

According to another characteristic of the invention, the electrical and hydraulic distribution bus includes a tube inside which the cleaning product is susceptible of circulating and inside which the power-supply and control network also extends, which can act as a resistance wire for raising the temperature of the cleaning product to be sprayed, in particular in very cold conditions. As an example, the power-supply and control network can pass through the hydraulic distribution bus in its center. It will then be understood that the hydraulic distribution bus is annular so as to accommodate in its center the power-supply and control network. In other words, the hydraulic distribution bus and the power-supply and control network are coaxial with respect to each other.

According to a characteristic of the invention, the electrical and hydraulic distribution bus comprises at least two portions connected to each other by a hydraulic and electrical connector. This particular embodiment allows two portions of the distribution bus separated by a wall of the vehicle to be electrically and hydraulically connected, for example a wall delimiting the passenger compartment and the engine compartment. The electrical and hydraulic connector can be assembled in an opening formed in this wall.

Advantageously, one end of each portion of the electrical and hydraulic distribution bus intended to be connected to each other supports an electrical and hydraulic port so as to connect the portion to the electrical and hydraulic connector.

According to other characteristics of the invention, it can be envisaged that at least a first spraying device is intended to clean an optical surface of a sensor used for an automatic analysis of the road scene, that is to say an analysis by the electronics of the vehicle in particular for controlling a driver and/or maneuver aid device of this vehicle, and that at least one second spraying device is intended to clean a glazed surface of the passenger compartment or an optical surface of a sensor used only for direct analysis by the driver of the vehicle. In this case, it is advantageous for the hydraulic distribution bus to be arranged such that the at least one second spraying device is disposed on the hydraulic distribution bus, common to each of the spraying devices, so as to be further away from an outlet of the pump supplying this hydraulic distribution bus than the at least one first spraying device.

In effect, in particular when the hydraulic distribution bus common to all of the spraying devices is an open circuit, it is understood that the cleaning product circulating at the end of this open circuit the furthest away from the pump can have a lower pressure than that of the cleaning product circulating at the pump outlet. Now, it is important for the optical detection systems associated with driver aid systems to be immaculate so as to avoid an inadequate analysis of the road scene detected by the on-board electronics of the vehicle, whereas if the driver himself or herself analyses the detected image of the road scene, he or she is better able to analyze the partially flawed image without making any error of judgment. It is then advantageously possible to place the second spraying device on a portion of the hydraulic distribution bus where the pressure is lower, the potential risk of a non-optimum cleaning operation having less impact. Furthermore, by thus prioritizing the hydraulic supply of cleaning product for first and second spraying devices, that is to say by placing them such that they are reached relatively quickly by the cleaning product at the pump outlet, it is possible to avoid any non-essential cleaning action penalizing the triggering or effectiveness of an action essential to the automatic processing of information coming from optical detection systems.

Figure 2:
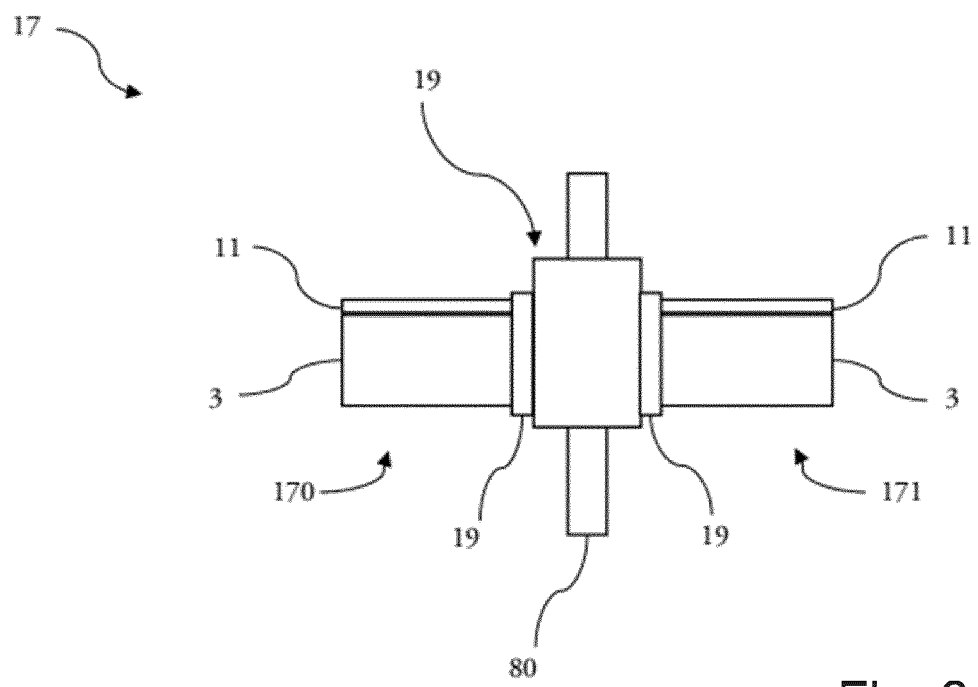
Figure 3:
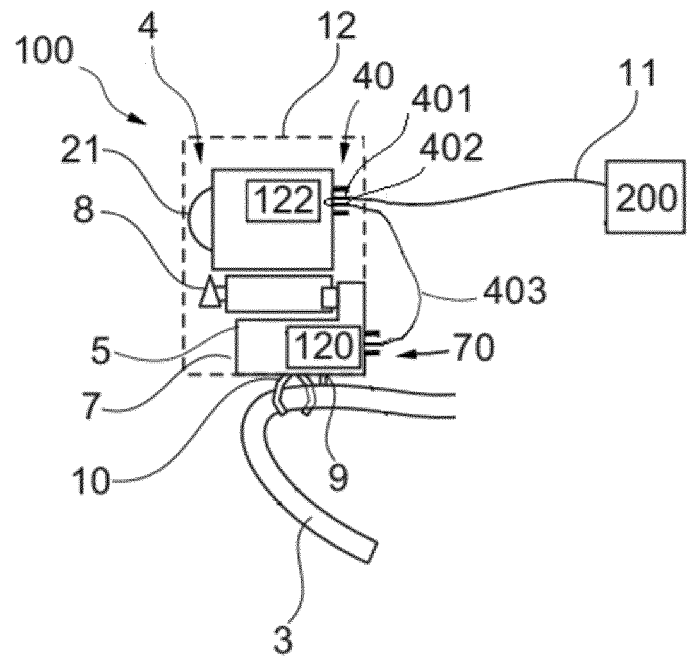
Figure 4:
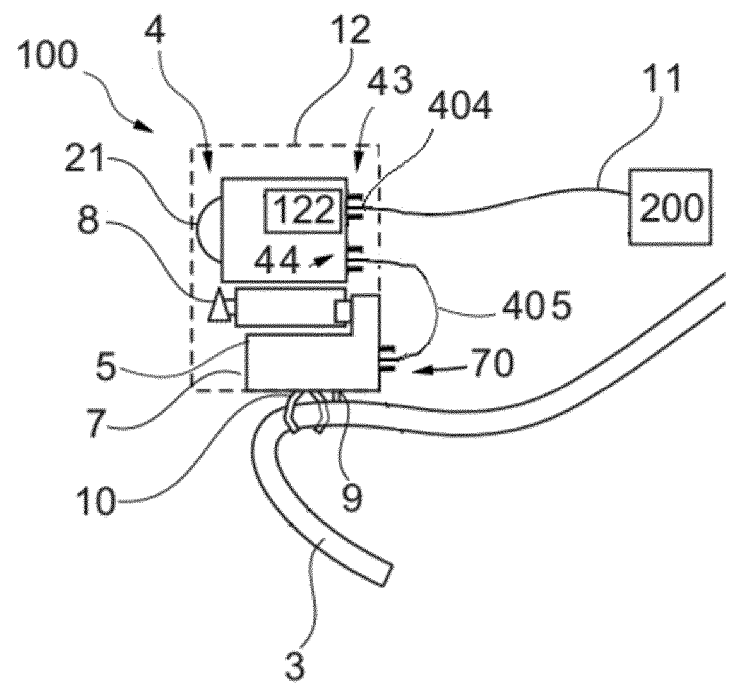
Figure 5:
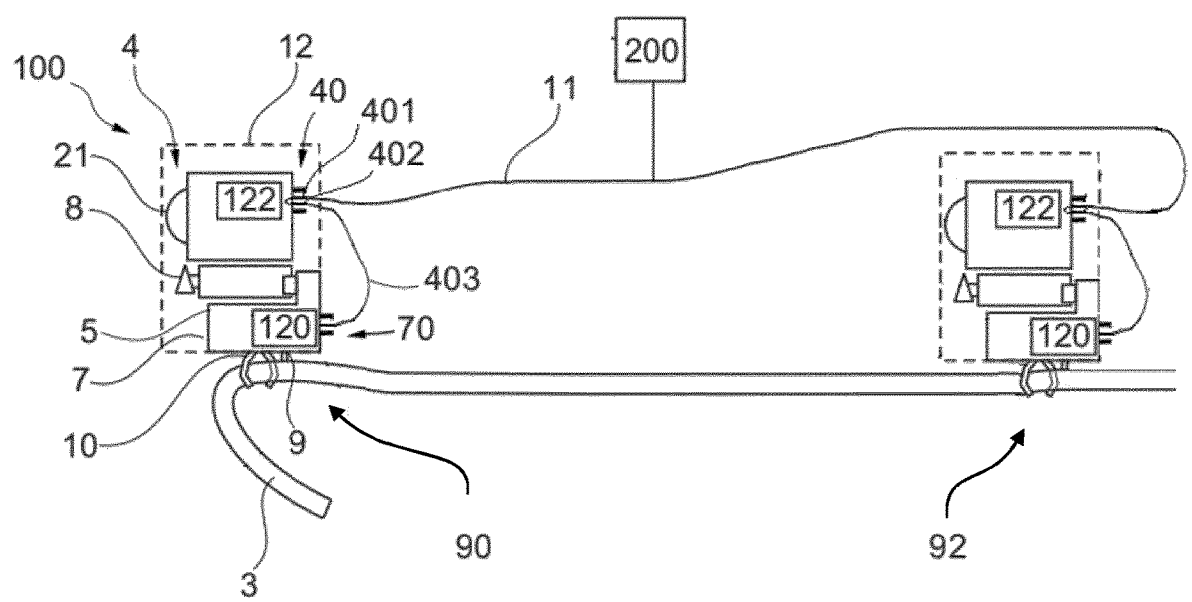

Other characteristics, details and advantages of the invention will emerge more clearly on reading the description given below as an indication, in relation to the drawings, in which:

FIG. 1 illustrates a schematic view of a motor vehicle equipped with an optical detection system according to the invention comprising a power-supply and control network and a hydraulic distribution bus coupled to each other and passing through the vehicle so as respectively to distribute power and control instructions, and a cleaning product, to spraying devices of the optical detection system assembled on the same vehicle, FIG. 2 illustrates a schematic view of a structural wall of the vehicle accommodating an hydraulic and electrical connector configured to connect two portions of the power-supply and control network and two portions of the hydraulic distribution bus, such as shown on FIG. 1, FIG. 3 illustrates a schematic view of a first embodiment of the invention in which an optical detection system is connected, on one hand, hydraulically to the hydraulic distribution bus and, on the other, electrically to a power-supply and control network, the optical detection system including a control electronic module fitted on the sensor and a control electronic module fitted on the spraying device, FIG. 4 illustrates a schematic view of a second embodiment of the invention in which an optical detection system is connected, on one hand, hydraulically to the hydraulic distribution bus and, on the other hand, electrically to a power-supply and control network, the optical detection system including a single control electronic module fitted on the sensor, and FIG. 5 illustrates a schematic view of two optical detection systems successively connected on one hand to a hydraulic distribution bus and on the other to a power-supply and control network in two zones separate from each other, the optical detection systems here conforming to that of the first embodiment illustrated on FIG. 3.

FIG. 1 shows a motor vehicle 1 equipped with an optical detection system 100 according to the invention, which allows at least one glazed surface 21 of the vehicle 1 to be cleaned. Such a glazed surface can be for example an optical surface 21 of an optical sensor 4 equipping the vehicle 1.

The optical detection system 100 thus comprises an optical sensor 4 and a spraying device 5 for spraying a cleaning product disposed in the vehicle 1 so as to be associated with cleaning a glazed surface 21 of this sensor 4, and it further includes a power-supply and control network 11 able to allow the supply of current and the transmission of control instruction to the optical detection system and more particularly to the device for spraying cleaning product. In the illustrated example, the vehicle is equipped with a plurality of spraying devices arranged in such a way as to be specifically dedicated to cleaning a single glazed surface, but it will be understood that several spraying devices could be dedicated to cleaning the same glazed surface, without departing from the context of the invention, and that the vehicle could be equipped with a single sensor and an associated spraying device, being understood that these variants would remain within the framework of the invention as long as the sensor or sensors are connected to a power-supply and control network 11 and as long as a sensor is connected to an associated cleaning device so as to transmit data aiming to control the operation of the spraying device.

More particularly, according to the invention, each of the spraying devices 5 is electrically connected to the power-supply and control network 11 by means of the sensor 4.

FIG. 5 illustrates an optical detection system 100, in which two assemblies, formed respectively by a sensor and a spraying device arranged in a casing 12 as will be described below, are connected to the same power-supply and control network 11 and to a common hydraulic distribution bus 3 independently of each other and in separate and successive zones 90, 92 (visible on FIG. 3) of the hydraulic distribution bus. In this non-limitative embodiment, it will be understood that a single power-supply and control network ensures the supply of power and control of all of the sensors and spraying devices of the detection system 100 arranged on this vehicle 1.

The optical detection system 100 further comprises a pump 60 and a tank for storing cleaning product. The pump 60 is configured to retrieve the cleaning product in the storage tank and to supply the main hydraulic pipe continuously with cleaning product. More particularly, an outlet 61 of the pump 60 is connected to a first end 30 of the hydraulic distribution bus 3. The result is that the hydraulic distribution bus 3 extends along the vehicle from this first end 30 to a second end 31. In the illustrated example, the second end 31 of the hydraulic distribution bus 3, opposite the first end 30, is closed such that the hydraulic distribution bus 3 forms an open hydraulic circuit. Of course, the hydraulic distribution bus could be configured so as to form a closed hydraulic circuit and the second end 31 of the hydraulic distribution bus could in this context be connected to the storage tank.

According to the invention, the power-supply and control network 11 is disposed in the vehicle to distribute current and control instructions to each assembly formed by a sensor and a spraying device, and for reasons of simplifying assembly and reducing costs, the power-supply and control network 11 advantageously runs along the hydraulic distribution bus 3, as is particularly visible on FIG. 2.

The hydraulic distribution bus 3 and the power-supply and control network 11 here respectively have a first portion 32 arranged in the front part of the vehicle, and a second portion 33 arranged in the passenger compartment, each portion winding in the corresponding part of the vehicle so as to distribute all of the spraying devices present in this part of the vehicle. It is understood that hydraulic continuity is achieved here between these two portions 32, 33 since a single pump is provided on the hydraulic distribution bus.

FIG. 2 shows a means of ensuring continuity between these portions 32, 33 when the bus and network 3, 11 have cause to pass through one or more walls 80 of the vehicle 1, this advantageously to optimize the routing of the bus and network in the vehicle 1 and thus to reduce the length required to implement same. In this case, the portions 32, 33 are connected to each other in pairs via a hydraulic and electrical connector 19. More particularly, a first portion 32 and a second portion 33 of the bus and network 3, 11 each support at their opposite end a hydraulic and electrical port for connecting them to the connector 19. It can be envisaged that two spraying devices 5 are connected to the same portion 32, 33 of the hydraulic distribution buses 3 and of the power-supply and control network 11 where each has a portion 32, 33 different from same.

The power-supply and control network 11 and the hydraulic distribution bus 3 can be configured to form a single electrical and hydraulic bus 17 for distributing the spraying devices 5, with the power-supply and control network, which can be arranged in particular in a peripheral pipe of a central pipe accommodating the hydraulic distribution bus 3, the assembly being formed for example by an extruded pipe.

With reference to FIGS. 3 to 5, a more detailed description will now be given of the sensors 4 and the spraying devices 5 of the optical detection system 100 and their cooperation with the power-supply and control network 11 common to at least two of these spraying devices, as they have been schematically shown on this FIG. 3. In what will follow, it is envisaged that the spraying devices all have the same shape so as to simplify the standardization of the optical detection system, but it is also obviously possible to adjust the shape and the size of the spraying device if necessary without departing from the context of the invention, as long as in accordance with what has been described previously, each spraying device is connected to the power-supply and control network by means of the sensor whose spraying device must clean the glazed surface.

In the first embodiment illustrated on FIG. 3, the spraying device and the sensor of the same assembly each includes a control electronic module, among which it is possible to identify a first electronic module 120 arranged in the spraying device 5 and a second control electronic module 122 arranged in the sensor 4.

More particularly, the second electronic module 122 is configured to control the operation of the sensor 4 and for example the triggering time and the duration of the detection, and to parameterize the exchange of data with a main electronic unit 200 on board the vehicle. And the first electronic module 120 is configured to control the operation of the spraying device 5 and for example the triggering time and the duration of spraying the cleaning product onto the associated glazed surface 21, and if need be, the specific zone of this glazed surface to clean.

The spraying device 5 comprises an atomizer 8 and an actuation device 7. In what will follow, the actuation device will be represented by a solenoid valve 7, without for all that being limitative of the invention, any actuator allowing the implementation of the operation of the atomizer being able to be used equally. When the solenoid valve 7 is powered and actuated, that is to say when it has received a control instruction in this sense by means of the first electronic control unit 120, it authorizes the passage to the atomizer 8 of the cleaning product circulating in the hydraulic distribution bus 3. The cleaning product is then sprayed by the atomizer 8 onto a glazed surface 21 of the sensor 4 associated with the spraying device 5. The position of the atomizer 8 before spraying the cleaning product can be adjusted by means of movement instructions generated by the first control electronic module 120.

The spraying device 5 comprises a hydraulic coupling component 9 for coupling the device to the hydraulic distribution bus 3. The hydraulic coupling component 9 has a shape susceptible on one hand of piercing the hydraulic distribution bus 3 and susceptible on the other of ensuring the passage of the cleaning product from this hydraulic distribution bus to the atomizer 8. To that effect, the coupling component can have the tubular and tapered shape of a syringe. When assembling the hydraulic coupling component 9 on the hydraulic distribution bus 3, a resin can be used to surround a contact zone between the hydraulic coupling component 9 and the hydraulic distribution bus 3, so as to ensure sealing of this contact zone.

The spraying device 5 also comprises a mechanical holding component 10 allowing fastening to the hydraulic distribution bus 3. In the illustrated example, the mechanical holding component 10 takes the shape of a clamp at least partially surrounding the main hydraulic pipe contributing to form the hydraulic distribution bus 3. It is possible for example to envisage a holding component with elastic deformation, defining in its original position a neck of substantially smaller dimensions than that of the pipe defining the distribution bus, the operator then having to force the coupling component to be deformed so as to be able to grip the hydraulic distribution bus, and the spring-back of the coupling component ensuring holding in position on the bus.

According to the invention, and whatever the way the spraying devices are hydraulically coupled, on a hydraulic distribution bus, common or not, and as visible for the assembly formed of a sensor and a spraying device shown as an example on FIG. 3 according to a first embodiment, or on FIG. 4 according to a second embodiment, each spraying device 5 is connected to the power-supply and control network 11 by means of the associated sensor 4, and on the same power supply and control network, independently of the electrical connection of the nearby spraying device. The assemblies formed by a spraying device and a sensor are electrically connected in connection zones separate from each other and spaced along the power-supply and control network.

The power-supply and control network 11 is electrically connected to a main electronic unit 200 on board the vehicle and configured in particular to define control information and instructions and to encode them for transmission to the spraying devices targeted by these instructions. Any type of communication network can be implemented here, and for example a network operating with a communication protocol of the broadband over powerline (BPL) type, or with a communication protocol of the LIN or CAN type.

The assembly formed by the spraying device 5 and the associated sensor 4 can be accommodated in a casing 12, as schematically illustrated on FIGS. 3 to 5. It should be noted that the hydraulic coupling or mechanical holding components can be supported by the casing in place of the solenoid valve as can have been described previously.

The sensor 4 can be a video camera or a laser scanner required to allow a drive and/or maneuver aid device of the vehicle 1 to operate. When a spraying device 5 is associated with such an optical sensor 4, same can communicate with the main electronic unit 200 equipping this vehicle 1, via an electrical connection cable not illustrated here, separate from the power-supply and control network 11. As an example, when the optical sensor 4 is a camera, this electrical connection cable allows a video signal to be transmitted to the main electronic unit 200.

As stated previously, the spraying device is electrically connected to the power-supply and control network by means of the associated sensor. More particularly, FIG. 3 illustrates the implementation of such a specific connection according to a first embodiment.

In this first embodiment, the sensor 4 comprises an electrical connection terminal 40 and the solenoid valve 7 comprises an electrical connection plug 70, the electrical connection plug 70 of the solenoid valve 7 being electrically connected to the power-supply and control network via the electrical connection terminal 40 of the sensor 4.

The electrical connection terminal 40 of the sensor 4 comprises two pins 401, 402 electrically connected to each other, with a first pin 401 which is electrically connected to the power-supply and control network 11 and the second pin 402 which is connected to the electrical connection plug 70 of the actuation device 7, by means of a control and power-supply connection cable 403.

As has been stated, the solenoid valve 7 includes a control electronic module which is specific to it and which is configured to control it.

It will then be understood that the electrical connection terminal 40 of the sensor 4 is used, on one hand to exchange data between the sensor 4 and the main electronic unit 200 via the power-supply and control network 11 and, on the other, to route this network 11 to the solenoid valve 7 of the spraying device 5, by means of the connection cable which is configured to pass both the power supply and the data and commands in accordance with the power-supply and control network 11.

The respective control electronic modules of the sensor and of the solenoid valve 7 are programmed to analyze continuously the data transmitted by the power-supply and control network 11. When one of the control electronic modules identifies an instruction emitted by the main electronic unit 200, transmitted via the power-supply and control network 11 and which is dedicated to it, for example a control instruction for opening the solenoid valve 7, it actuates the sensor or the solenoid valve associated with it.

The second embodiment illustrated on FIG. 4 differs from that which precedes in that the assembly formed by a sensor 4 and a spraying device 5 only includes one control electronic module, and more particularly in that only the sensor includes a control electronic module 122.

As previously, the electronic module 122 arranged in the sensor is configured to control the operation of this sensor 4 and for example the triggering time and the duration of detection, and to parameterize the exchange of data with a main electronic unit 200 on board the vehicle, and it is parameterized here in a complementary way so as to determine operating conditions of the spraying device according to control instructions coming from the power-supply and control network: as an example, the electronic module fitted on the sensor 4 is configured to determine when to authorize or cut off the electrical power supply of the spraying device so as to control the triggering time and the duration of spraying the cleaning product onto the associated glazed surface 21.

In this case, the sensor 4 comprises a first electrical connection terminal 43 and a second electrical connection terminal 44 separate from each other, whereas in accordance with what precedes, the actuation device 7 comprises an electrical connection plug 70.

The first electrical connection terminal of the sensor is connected to the power-supply and control network 11 and the second electrical connection terminal of the sensor is connected to the electrical connection plug of the actuation device.

In this second embodiment, only the first electrical connection terminal 43 includes a pin 404 dedicated to the transmission of data. This pin 404 of the first electrical connection terminal 43 is electrically connected on one hand to the power-supply and control network 11 and on the other to the control electronic module 122.

In parallel, each electrical connection terminal 43, 44 includes two pins dedicated to supplying power, among which one pin dedicated to a positive power supply terminal and one pin dedicated to earth, these terminals being electrically connected two by two, that is to say the pins dedicated to the positive power supply together and the pins dedicated to earth together. The two pins of the first electrical connection terminal 43 are intended to be electrically connected to the power-supply and control network 11 and the two pins of the second electrical connection terminal 44 are intended to be electrically connected to second and third pins of the electrical connection plug 70 of the actuation device 7, by means of a power supply connection cable 405, only the electrical power supply circulating between the sensor and the spraying device in this second embodiment.

FIG. 5 shows two spraying devices including these hydraulic coupling components and these mechanical holding components cooperating with the hydraulic distribution bus 3 at two separate coupling zones 90, 92, and the figure simultaneously illustrates the electrical connection of these two spraying devices, by means of the associated sensor, to the power-supply and control network 11, configured here as a network powered from the main electronic unit 200.

It is understood that this disposition of the spraying devices successively arranged along a hydraulic distribution bus and along a power-supply and control network contributes, as a complement to the specific arrangement according to the invention according to which each spraying device is electrically connected to the bus or power-supply and control network by means of an associated sensor, which must in turn be connected to this bus or power-supply and control network, makes it possible significantly to reduce the quantity of electrical cables to be provided in order to equip the vehicle with a detection device having several sensors arranged all round the vehicle.

It will have been understood on reading what precedes that the optical detection system according to the invention is advantageous in that it includes an electrical network configured to connect at minimum cost the different elements making up this optical detection system, and in particular a sensor and its associated cleaning device. This cleaning device is advantageously electrically connected to the sensor which acts as an intermediary between this cleaning device and the power-supply and control network. In all application cases, the optical detection system according to the invention makes it possible to reduce the length of the electrical connection cables as a result of the closeness of the sensor and the associated spraying device, and in certain cases, this system can make it possible to centralize the control electronics on the sensor, only one electrical power supply then being sent or not to the spraying device according to the instruction controlling the spraying device that is captured by the control electronics of the optical sensor.

Of course, the characteristics, the embodiment variants of the invention can be associated with each other, according to diverse combinations, insofar as they are not incompatible or exclusive with respect to each other. It is possible in particular to imagine variants of the invention comprising only one choice of characteristics subsequently described in a manner isolated from the other described characteristics, if this choice of characteristics is sufficient to confer a technical advantage or to differentiate the invention with respect to the prior art.

The invention claimed is:

1. An optical detection system for a vehicle comprising:
   at least one sensor; and
   a spraying device for spraying a cleaning product onto the glazed surface of the at least one sensor, the spraying device connected to a hydraulic distribution bus extending across the vehicle,
   the at least one sensor being electrically connected to a power-supply and a control network extending across the vehicle and transmitting control information for the spraying device,
   wherein the at least one sensor and the spraying device are electrically connected to each other in the aim of controlling the spraying device, and
   wherein the power-supply and control network and the hydraulic distribution bus are jointly and parallelly disposed in a single tube to form a single joint electrical and hydraulic bus for distributing spraying devices.

2. The optical detection system as claimed in claim 1, wherein the spraying device comprises an atomizer and an actuation device for actuating the atomizer.

3. The optical detection system as claimed in claim 2, wherein the actuation device and the sensor include electrical connection elements that cooperate to transmit at least one selected from a group consisting of a power supply and a control instruction from the power-supply and control network to the actuation device, by the sensor.

4. The optical detection system as claimed in claim 3, wherein the actuation device includes a control electronic module for ensuring control of same.

5. The optical detection system as claimed in claim 4, wherein the sensor comprises an electrical connection terminal and the actuation device comprises an electrical connection plug, the electrical connection plug of the actuation device being electrically connected to the power-supply and control network via the electrical connection terminal of the sensor.

6. The optical detection system as claimed in claim 4, wherein the electrical connection terminal of the sensor comprises two pins electrically connected to each other, a first pin being electrically connected to the power-supply and control network and the second pin being connected to the electrical connection plug of the actuation device, by a control and power-supply connection cable.

7. The optical detection system as claimed in claim 4, wherein the sensor includes a control electronic module configured to control the operation of the actuation device.

8. The optical detection system as claimed in claim 7, wherein the sensor comprises a first electrical connection terminal and a second electrical connection terminal separate from each other, and the actuation device comprises an electrical connection plug, the first electrical connection terminal of the sensor being connected to the power-supply and control network and the second electrical connection terminal of the sensor being connected to the electrical connection plug of the actuation device.

9. The optical detection system as claimed in claim 8, wherein only a single electrical connection terminal includes a pin dedicated to the transmission of data, this pin being connected to the control electronic module of the sensor and to the power-supply and control network.

10. The optical detection system as claimed in claim 9, wherein each electrical connection terminal includes two pins dedicated to supplying power, with one pin dedicated to a positive power supply terminal and one pin dedicated to earth, the two pins being electrically connected two by two, the two pins of the first electrical connection terminal being electrically connected to the power-supply and control network and the two pins of the second electrical connection being electrically connected to second and third pins of the electrical connection plug of the actuation device by means of a power supply connection cable.

11. The optical detection system as claimed in claim 1, wherein a casing accommodates the sensor and the spraying device.

12. The optical detection system as claimed in claim 1, further comprising: a plurality of sensors and associated devices for spraying a cleaning product, the plurality of sensors being electrically connected to a databus, forming the power-supply and control network, independently of each other.

13. The optical detection system as claimed in claim 1, wherein the single electrical and hydraulic distribution bus comprises a tube comprising, a central channel and a peripheral channel.

14. The optical detection system as claimed in claim 13, wherein the central channel is for circulating the cleaning product, and wherein strands for the power-supply and control circuits are disposed peripherally to the central channel, within the tube.

15. The optical detection system as claimed in claim 13, wherein the central channel is for strands for the power-supply and the control network, and wherein the cleaning product circulates peripherally to the central channel.

16. The optical detection system as claimed in claim 15, wherein the strands for the power supply and the control network are configured as resistance wires for heating the cleaning product.

* * * * *